Aug. 4, 1959

F. M. WAGNON 2,897,750

COTTON PRESS

Filed May 1, 1956

INVENTOR.
Francis M. Wagnon.
BY
Mason & Mason
Attorneys.

Aug. 4, 1959 F. M. WAGNON 2,897,750
COTTON PRESS

Filed May 1, 1956 2 Sheets-Sheet 2

INVENTOR.
Francis M. Wagnon.
BY
Mason & Mason
Attorneys.

United States Patent Office 2,897,750
Patented Aug. 4, 1959

2,897,750

COTTON PRESS

Francis M. Wagnon, Borger, Tex.

Application May 1, 1956, Serial No. 581,919

7 Claims. (Cl. 100—244)

This invention relates to a cotton press and is particularly directed to the production of a press which is comparatively light and which possesses great strength, i.e., it can sustain great pressures without deformation of the parts during the pressing operation.

The principal object of the invention is to provide a cotton press, the parts of which are so assembled that maximum lightness and strength are provided for pressing cotton into bales.

A further object is to provide means for causing all the pressure to expand lengthwise of the baling mechanism, i.e., in the same direction as the movements of the pressing elements or trompers.

An additional object is to provide a press having novel end means, said ends being composed of inclined members which converge toward the sources of pressure, or pressing cylinders.

Other objects will appear herein and throughout the specification.

Figures 1, 5:
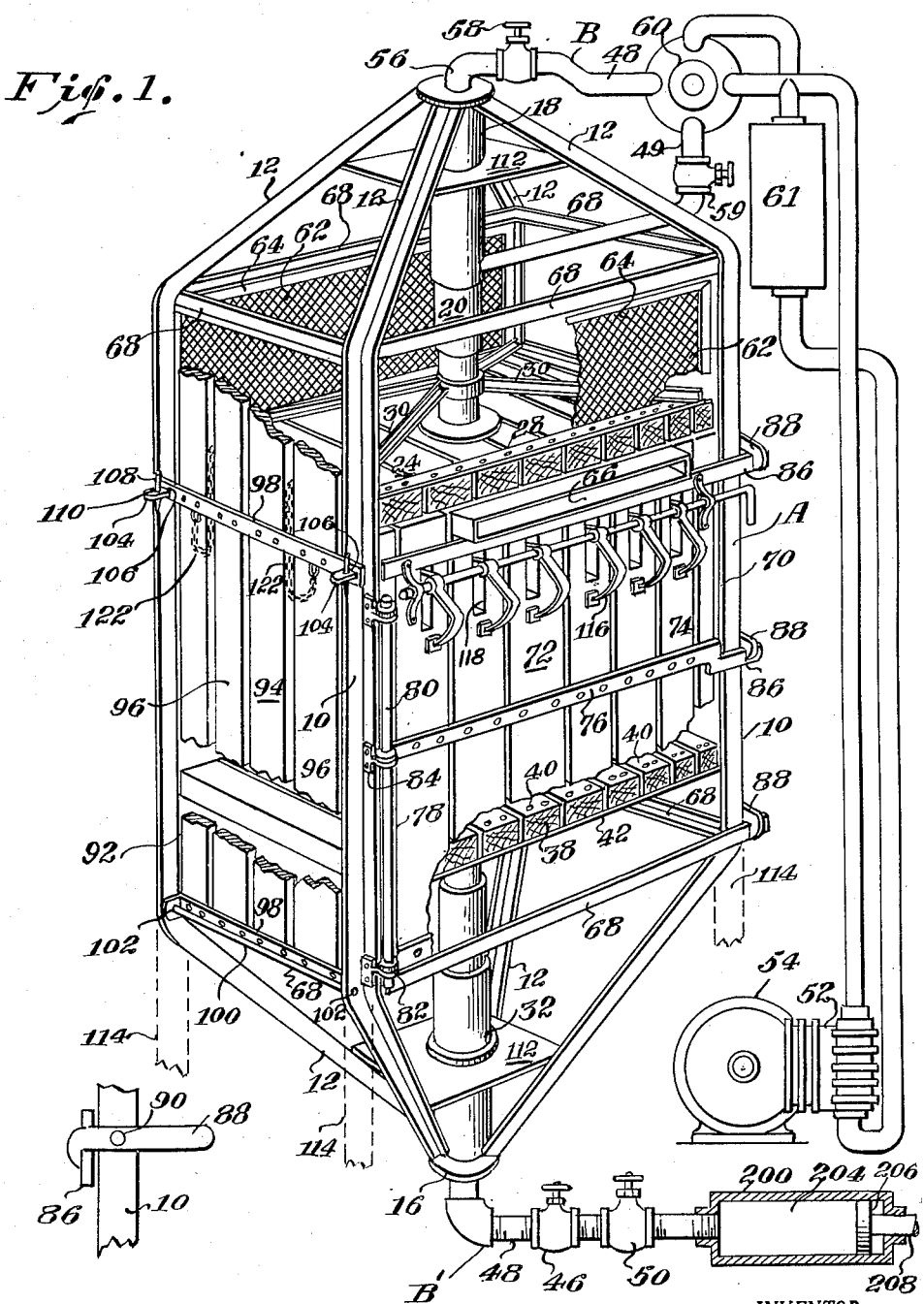
Figure 1 is a perspective view of the press with parts broken away to show the interior thereof, certain of the hydraulic mechanism being shown in diagram.
Figure 5 is an enlarged detail of the end latching mechanism.

The present invention is directed to a cotton pressing mechanism that may be mounted on a vehicle or be located at a designated place where it is desired to press the cotton, preferably after the cotton has been treated to remove debris and cotton bolls, whereby only cotton with the lint and seeds removed is fed into the cotton baler.

Referring to the drawings, a cotton baler or press is indicated as a whole by the letter A, the hydraulic system for furnishing pressure to the trompers or pressers is indicated as a whole by the letter B and B'.

Figure 2:
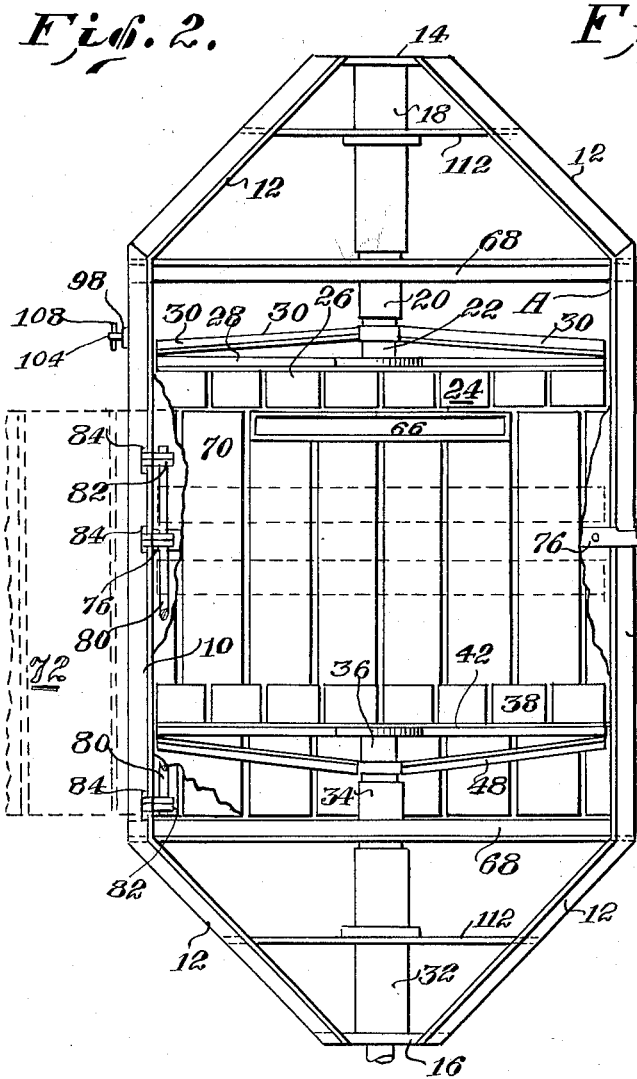
Figure 2 is a side elevation of the press with one of the ends shown in open position in dotted lines, and omitting the hydraulic circuits, and the screens.
Figure 3:
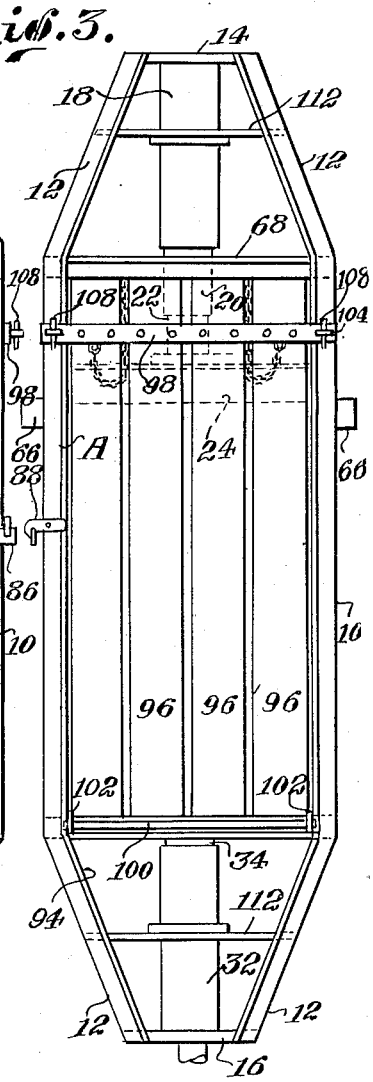
Figure 3 is an end view of the structure shown in Figure 2.

Referring to the cotton press, as particularly shown in Figures 1 to 3, there are a plurality of frame members 10, which frame members may be angular in cross-section. The frame members 10 and 12 form a press box having sides, inclined ends, and inlet openings in the sides as hereinafter described. Each frame member has inwardly inclined opposite ends 12, those at one end terminating in a support 14, and those at the opposite end terminating in the support 16.

The support 14 sustains the pressure from the hydraulic means 18 comprising a plurality of telescoping cylinders 20 and 22, and the cylinder 22 is rigidly attached to the primary tromping or pressing member 24, which is guided in its reciprocating movements by the frame members 10.

The pressing member 24 is composed of a plurality of spaced boards 26 held together by the braces 28 and 30.

The oppositely located support 16 mounts the other hydraulic means 32 which also preferably consists of a plurality of telescoping cylinders 34 and 36, the latter cylinder being rigidly attached to the secondary tromping or pressing member 38 which is also guided in its movements toward and away from a primary pressing member by the frame members 10. The secondary pressing member is also comprised of a plurality of spaced boards 40 that are supported by braces 42 and 44.

The movements of each pressing member are controlled by a hydraulic system, shown diagrammatically at B and B'. This hydraulic system causes the continuous reciprocation of the primary pressing member, and, either at or prior to the beginning of the pressing operation, the movement of the secondary pressing member to its uppermost position. During the reciprocating movements of the primary pressing member, and as cotton is fed between both pressing members, the secondary pressing member is forced gradually away from the primary pressing member due to a pop valve or a bleed valve shown at 46. This bleed valve is preferably manually set so as to bleed back to the pump and reservoir, hereinafter described, fluid in the hydraulic mechanism 32 when a certain pressure has been reached.

As shown in Figure 1 the hydraulic means 32 is connected to a conduit 48. Also located in the line is a conventional hand operated shut-off valve 50. This line leads to the pump 200 or to a reservoir in the line, not shown. The pump 200 is driven by a motor, and the cylinder space 204 serves as a reservoir. The motor, not shown, drives through rod 208 the piston 206. When the motor is off and after one reciprocation to the left, the piston gradually moves to the right as the space 204 fills up, until the position is reached as shown in Figure 1.

The hydraulic means 18 is connected to the conduit 56 in which is located the hand operated shut-off valve 58 and in which conduit is also located the motor driven reversing valve shown diagrammatically at 60. When this valve is in operation it will periodically reverse the fluid to the hydraulic mechanism 18 in proper timed sequence, so that the primary pressing member during the pressing operation, will be continuously reciprocated. There can be a "dwell" at either extremity of movement of the means 18. In other words, this motor-driven valve 60 will cause the pressing member 24 to move toward and away from the pressing member 38 as adjusted by the valve 60. Conduit 56 is preferably connected to a reservoir 61, not shown, and from it to the pump 52, as driven by motor 54.

Figure 4:
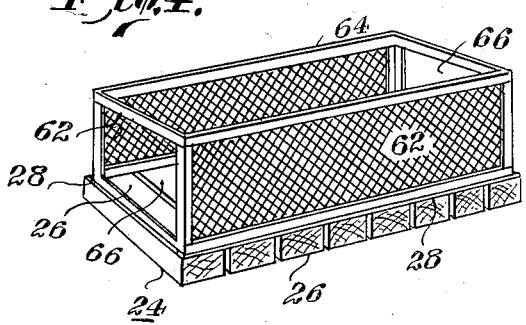
Figure 4 is an elevation of the top tromping or pressing member and parts attached thereto.

Mounted on each side of the primary pressing member are meshed screens 62. These screens are supported by rectangular frames 64. The frames are connected to each other at their top ends by frame pieces 68, as shown particularly in Figure 4.

Cotton inlet conduit openings from a blown source of cleaned cotton, not shown, are indicated by the numerals 66, each opening being so positioned that it will be covered by its screen 62 when the primary pressing member is in its lowermost position. When the presser 24 moves upwardly in its reciprocating movements it uncovers both conduit openings 66 and allows cotton to come in to the space between the pressing members 24 and 38. However, when the primary pressing member moves downwardly, each screen 62 covers its opening 66 to thereby prevent cotton from finding its way on top of the tromping or pressing member 24, but as the pressing member moves back to its retracted position, each opening is uncovered by its screen 62 to thereby allow more cotton to come into the press.

During the time that the primary tromping member has moved past the openings 66 toward the secondary tromping or pressing member, cotton from a cotton gin mechanism not shown, or other element, as it is blown toward the openings piles up on the screens 62, but as the screens move upwardly again this cotton is scraped off and blown into the space between the trompers or pressing members by the blower mechanism that forces cotton into the openings.

As shown in Figures 1 to 3, the frame members 12 are maintained properly spaced from each other by the angular pieces 68. These press the frame members 10, and may be composed of metal members which are angular in cross-section, all of them being welded or otherwise rigidly secured to frame members 10.

The opposite wider sides of the press, as shown at 70 are closed by doors 72. Each door is composed of a plurality of spaced boards 74 which are held together by horizontal braces or reinforcing members 76. These latter form part of a frame 78 which mounts the pintle 80 at one side edge of each door. The pintle is pivotally mounted on bearings 82 (three being shown for each door), that are attached to brackets 84, the brackets being mounted on one of the frame pieces 12. At the opposite side of the door from the pintle 80 each brace member 76 is provided with a latching part 86 that is engaged by the pivoted latch 88, which latter is mounted on a pivot 90 on the frame member 10, as shown in Figure 5. It will be understood that any suitable latching means may be used, the ones shown being for illustrative purposes only.

The narrower sides of the press are provided with openings 92. These openings are closed by ends 94, each comprising a plurality of spaced boards 96. These boards are held in spaced relationship by the door braces 98. The ends or doors 94 are mounted so as to pivot in a vertical plane. This mounting comprises a lower pintle 100 mounting in the flanges of frame members 10. Each end is held in latched position as shown in Figures 1 and 3 by means of projections 104 on the frame members 10, each projection extending through a slot 106 in the upper door brace member 98. Each projection is held in its slot by a pin 108 which extends through an aperture 110 in its projection 104. When the pins are removed the ends swing in a vertical plane on a horizontal pivot comprising lower pintle 100.

Telescoping cylinder 20 is prevented from moving sideways during its operation by the platform 112. This platform has an aperture, not shown, through which cylinder 20 extends, and it is rigidly mounted in this aperture. Telescoping cylinder 18 is prevented from moving sideways during its operation by the platform 112. This platform has an aperture, not shown, through which cylinder 18 extends, and it is rigidly mounted in this aperture. 114 indicates any suitable press supporting means.

On opposite sides of the wider door 72 are mounted a plurality of pivoted dogs 116. These extend through openings 118 in the boards 74, forming the doors 72 in a manner well known in the pressing art. Each series of dogs is mounted on a shaft 120.

*Operation*

The press of this invention of cotton press is such that all of the pressure is lengthwise of the press, i.e., in a vertical direction, as viewed in Figures 1, 2, and 3. It will be understood, however, that the press may be mounted in any position, that is, it may be inclined, or it may lie on one of its sides, depending upon conditions, as it will operate to perform the pressing of cotton into bales with the hydraulic cylinders operating in a vertical direction, or in a horizontal direction, or even in an inclined direction, depending upon the position in which the press is mounted, which latter position depends upon conditions of use. The movement of the pressing members, including the trompers or pressing members 24 and 38, tends to cause the press sides to pull together instead of expanding outwardly against the doors 72 and 94. This is due to the location and mounting of the pressing members within the frame members 10 and particularly against the inclined ends 12.

The press constructed as described above will press the cotton with less power for the reason that the cotton as it comes into the press is tromped or pressed in comparatively small or thin sheets by successive movements of pressing member 24. The telescopic press 32 holds the secondary press board up to a very small space between it and the primary pressing member. The pressure release means connected with the secondary pressing member, namely the pop-off valve 46 can be manually set to hold pressure at any amount, so that the pressure needed to depress this secondary pressing member can be increased to an amount sufficient to press the bales of cotton at any pressure desired. In other words, the secondary pressing member moves towards its end of the press under the pressure of the reciprocating primary pressing member, as the cotton is blown in through cotton inlet openings 66 after each movement of the primary pressing member toward its end of the press. During each movement, these openings are uncovered to let more cotton into the press. It will be understood, however, that there may be only one opening, as the boards 74 may extend, if desired, up to the frame member 68 on one side. This will close one of the inlet openings. The construction shown is preferred, whereby two inlet openings are provided so that the cotton may be evenly spread on top of the secondary pressing member. The reciprocating primary pressing member 24 will press the cotton as it comes into the press in small sheets on top of the secondary pressing board and will force the cotton under the ends of the dogs that extend through the openings 118 into the interior of the press.

As the primary tromping member goes back towards its end the dogs hold the cotton in position. When the primary pressing member moves again toward the secondary pressing member the screens 62 close the cotton inlet openings 66, preventing cotton from getting on top of the primary pressing member. As the primary pressing member moves toward the inclined end in which its hydraulic means is located, the screens also withdraw from the inlet openings, and allow the cotton to come in to the space again between the pressing members.

Before starting the operation of pressing, the cotton into a bale, lagging is laid on the top of the secondary pressing member, as viewed in the figures, it being understood that at this time the secondary pressing member has moved to the limit of its movement toward the primary pressing member, leaving a small space between them. As the operation proceeds with the primary pressing member continuously reciprocating and pressing each layer of cotton against the secondary pressing member, the latter continuously moves under the pressure, as set by the bleed valve 46, toward its end of the press. At the completion of the pressing operation, that is, when the bale is full of cotton and the lower tromping board has moved to its lowest position, with the parts as shown in Figure 1, a second layer of lagging is spread over the top of the dogs, so as to cover the cotton, and between the cotton and the primary pressing member. A suitable lever, not shown, is then operated in a conventional manner to release the dogs and to cause them to be withdrawn from the openings 118. The primary pressing member is then caused to move downwardly, by operating the hydraulic mechanism controlled by valve 60, as far as it can move against the cotton. This operation is followed by opening the wide door 72, followed by the opening of the narrow doors or ends 94. Ties are then applied to the bale. When these ties are properly tied the bale of cotton may be manually pushed through the wide door at either side of the press. The narrow side doors are prevented from moving to any great extent by the chains 122. These chains have one of their ends connected to the door and the opposite ends fastened to any part of the stationary framework of the press. This will prevent the narrow doors from moving to a horizontal position on their pivots 100.

It is noted that the cotton press is equally adapted for pressing other materials.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A cotton press comprising a press box having pairs parallel sides, said press box having opening means, a reciprocating primary pressing member having cover means, a pressure responsive secondary pressing member movable in said box on one side of said opening means, said reciprocating primary pressing member being movable from a limit of movement on the opposite side of said opening means to a point on the said one side of said opening means whereby to continuously press the cotton in thin sheets, a hydraulic means for causing reciprocation of said primary pressing member, and for operating said secondary pressing member, and bleed valve means operatively associated with said secondary pressing member, said press box including frame members having inclined sides at the opposite ends of the said press box, said frame members extending from the pairs of sides of said press box toward each other and toward an extension of the central axis of said press whereby said inclined sides form, substantially apexes at the opposite ends of said box, means for supporting said hydraulic means on said inclined sides substantially adjacent each apex, said last named means including means for supporting said hydraulic means for said primary pressing member solely by said inclined portions at one of the ends of said press box and means for supporting said hydraulic means for said secondary pressing member solely by the inclined portions at the other end of said press box.

2. A cotton press comprising a press box having pairs of parallel sides, said press box having opening means, a reciprocating primary pressing member having cover means, a pressure responsive secondary pressing member movable in said box on one side of said opening means, said reciprocating primary pressing member being movable from a limit of movement on the opposite side of said opening means to a point on the said one side of said opening means whereby to continuously press the cotton in thin sheets, a hydraulic means for causing reciprocation of said primary pressing member, and for operating said secondary pressing member, and manually adjustable bleed valve means operatively associated with said secondary pressing member, said press box including frame members having inclined sides at the opposite ends of the said press box, said frame members extending from the pairs of sides of said press box toward each other and toward an extension of the central axis of said press whereby said inclined sides form, substantially apexes at the opposite ends of said box, means for supporting said hydraulic means on said inclined sides substantially adjacent each apex, said last named means including means for supporting said hydraulic means for said primary pressing member solely by said inclined portions at one of the ends of said press box and means for supporting said hydraulic means for said secondary pressing member solely by the inclined portions at the other end of said press box.

3. A cotton press comprising a press box having pairs of parallel sides, said press box having opening means, a reciprocating primary pressing member having cover means, a pressure responsive secondary pressing member movable in said box on one side of said opening means, said reciprocating primary pressing member being movable from a limit of movement on the opposite side of said opening means to a point on the said one side of said opening means whereby to continuously press the cotton in thin sheets, a hydraulic means for causing reciprocation of said primary pressing member, and for operating said secondary pressing member, and bleed valve means operatively associated with said secondary pressing member, said press box including frame members having inclined sides at the opposite ends of the said press box, said hydraulic means including hydraulically operated cylinder means located at opposite ends of said press box, said frame members extending from the pairs of sides of said press box toward each other and toward an extension of the central axis of said press whereby said inclined sides form, substantially apexes at the opposite ends of said box, means for supporting said hydraulic means on said inclined sides substantially adjacent each apex, said last named means including means for supporting said hydraulic means for said primary pressing member solely by said inclined portions at one of the ends of said press box and means for supporting said hydraulic means for said secondary pressing member solely by the inclined portions at the other end of said press box.

4. A cotton press comprising a press box having pairs of parallel sides, said press box having opening means, a reciprocating primary pressing member having cover means, a pressure responsive secondary pressing member movable in said box on one side of said opening means, said reciprocating primary pressing member being movable from a limit of movement on the opposite side of said opening means to a point on the said one side of said opening means whereby to continuously press the cotton in thin sheets, a hydraulic means for causing reciprocation of said primary pressing member, and for operating said secondary pressing member, and manually adjustable bleed valve means operatively associated with said secondary pressing member, said press box including frame members having inclined sides at the opposite ends of the said press box, said hydraulic means including hydraulically operated cylinder means located at opposite ends of said press box, said frame members extending from the pairs of sides of said press box toward each other and toward an extension of the central axis of said press whereby said inclined sides form, substantially apexes at the opposite ends of said box, means for supporting said hydraulic means on said inclined sides substantially adjacent each apex, said last named means including means for supporting said hydraulic means for said primary pressing member solely by said inclined portions at one of the ends of said press box and means for supporting said hydraulic means for said secondary pressing member solely by the inclined portions at the other end of said press box.

5. A cotton press comprising a press box, said press box having opening means, a reciprocating primary pressing member, a pressure responsive secondary pressing member movable in said box on one side of said opening means, said reciprocating primary pressing member being movable from a limit of movement on the opposite side of said opening means to a point on the said one side of said opening means, a hydraulic means for causing reciprocation of said primary pressing member, and for operating said secondary pressing member, and bleed valve means operatively associated with said secondary pressing member, said hydraulic means including a motor-driven reversing valve for causing reciprocating movements of said primary means, said cotton press having four sides including parallel frame members at the corners of said press, each frame member being extended beyond said sides and having inclined opposite end portions inclined toward each other and toward an extension of the central axis of said press so as to form an apex at opposite ends, means mounting the hydraulic means for said primary pressing member in one apex whereby the same is solely supported by said inclined side portions, and means for supporting the hydraulic means for said secondary pressing member in the other apex whereby the same is solely supported by the said inclined side portions thereof.

6. A cotton press comprising a press box, said press box having opening means, a reciprocating primary pressing member, a pressure responsive secondary pressing member movable in said box on one side of said opening means, said reciprocating primary pressing member being movable from a limit of movement on the opposite side of said opening means to a point on the said one side of said opening means, a hydraulic means for causing reciprocation of said primary pressing member, and for operating said secondary pressing member, and manually adjustable bleed valve means operatively associated with said secondary pressing member, said hydraulic means including a motor-driven reversing valve for causing reciprocating movements of said tromping or pressing means, said cotton press having four sides including parallel frame members at the corners of said press, each frame member being extended beyond said sides and having inclined opposite end portions inclined toward each other and toward an extension of the central axis of said press so as to form an apex at opposite ends, means mounting the hydraulic means for said primary pressing member in one apex whereby the same is solely supported by said inclined side portions, and means for supporting the hydraulic means for said secondary pressing member in the other apex whereby the same is solely supported by the said inclined side portions thereof.

7. A cotton press comprising a press box, said press box having opening means, a reciprocating primary pressing member, a pressure responsive secondary pressing member movable in said box, said reciprocating primary pressing member being movable from a limit of movement on the opposite side of said opening means to a point at least substantially parallel to said opening means, motor driven reversible valve means for causing continuous reciprocation of said primary pressing member, and for operating said secondary pressing member, and bleed valve means operatively associated with said secondary pressing member, said cotton press having four sides including parallel frame members at the corners of said press, each frame member being extended beyond said sides and having inclined opposite end portions inclined toward each other and toward an extension of the central axis of said press so as to form an apex at opposite ends, means mounting the hydraulic means for said primary pressing member in one apex whereby the same is solely supported by said inclined side portions, and means for supporting the hydraulic means for said secondary pressing member in the other apex whereby the same is solely supported by the said inclined side portions thereof.

References Cited in the file of this patent

UNITED STATES PATENTS

| | | |
|---|---|---|
| 1,182,023 | McGregor | May 9, 1916 |
| 1,408,450 | Gilson | Mar. 7, 1922 |
| 2,005,291 | Grimes | June 18, 1935 |
| 2,722,174 | Albers | Nov. 1, 1955 |
| 2,780,989 | Guy | Feb. 12, 1957 |